United States Patent
Yasukawa et al.

(10) Patent No.: US 8,740,436 B2
(45) Date of Patent: Jun. 3, 2014

(54) DISPLAY ASSEMBLY AND METHODS

(75) Inventors: James A. Yasukawa, Redmond, WA (US); Kevin Mundt, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 381 days.

(21) Appl. No.: 13/024,523

(22) Filed: Feb. 10, 2011
(Under 37 CFR 1.47)

(65) Prior Publication Data

US 2012/0206939 A1    Aug. 16, 2012

(51) Int. Cl.
*F21V 7/22* (2006.01)
*H01J 9/24* (2006.01)

(52) U.S. Cl.
USPC ........... 362/606; 362/607; 362/608; 362/609; 362/612; 362/615

(58) Field of Classification Search
USPC .................. 362/606–609, 615–617
See application file for complete search history.

(56) References Cited

U.S. PATENT DOCUMENTS

| | | | | |
|---|---|---|---|---|
| 6,827,456 | B2 * | 12/2004 | Parker et al. | 362/629 |
| 7,125,131 | B2 * | 10/2006 | Olczak | 362/19 |
| 7,665,876 | B2 * | 2/2010 | Taya et al. | 362/607 |
| 2006/0244877 | A1 | 11/2006 | Noh et al. | |
| 2009/0021948 | A1 * | 1/2009 | Kim et al. | 362/310 |
| 2009/0109702 | A1 * | 4/2009 | Jung | 362/609 |

* cited by examiner

*Primary Examiner* — Stephen F Husar
*Assistant Examiner* — James Cranson, Jr.
(74) *Attorney, Agent, or Firm* — Baker Botts L.L.P.

(57) ABSTRACT

A display assembly is disclosed providing a panel display, a light guiding element having a first surface and a second surface and a light source operable to illuminate the light guiding element. The display further includes a layer of reflective material in contact with the first surface of the light guiding element, wherein the first surface receives light from the light source and transmits the light towards the panel display and the second surface of the light guide.

20 Claims, 3 Drawing Sheets

DISPLAY ASSEMBLY AND METHODS

TECHNICAL FIELD

The present disclosure relates generally to the field of information handling systems, and more specifically, to displays of information handling systems and methods for manufacturing thereof.

BACKGROUND

As the value and use of information continues to increase, individuals and businesses seek additional ways to process and store information. One option available to users is an information handling system (IHS). An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for such systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Typically, an IHS may provide a display utilized to visually present data. Various types of displays may include cathode ray tubes (CRTs), projection displays, and flat panel displays. Frequently, a flat panel display may be utilized in space constrained areas and may be aesthetically pleasing to consumers. For instance, flat panel displays may often be utilized in portable IHSs (e.g., laptops, handhelds) where space and size is a concern. While consumers may find thinner displays more aesthetically pleasing, the display may become less rigid as components of the display assembly are made thinner.

The IHS display, its assembly and system chassis may be adhered (e.g., laminated) together to impart improved rigidity of the display. For instance, components of a display assembly such as a light guiding element (i.e., light guide), reflective film and display housing, may be laminated to provide a more rigid display assembly. However, by utilizing an adhesive to attach a light guide to the reflective film and display housing, the optical properties of the light guide and/or display may be impaired. In particular, space between components of a display assembly may prevent the light guide from properly reflecting light as intended. Thus, a need exists for methods and systems for improving rigidity of an IHS display, such as by a lamination process, while maintaining the optical properties of the display.

SUMMARY

The following presents a general summary of several aspects of the disclosure in order to provide a basic understanding of the disclosure. This summary is merely a general overview of the disclosure and is not intended to identify key or critical elements of the disclosure or to delineate the scope of the claims. The following summary presents some concepts of the disclosure in a general form as a prelude to the more detailed description that follows.

One aspect of the disclosure is display assembly providing a panel display, a light guiding element having a first surface and a second surface and a light source operable to illuminate the light guiding element. The display further includes a layer of reflective material in contact with the first surface of the light guiding element, wherein the first surface receives light from the light source and transmits the light towards the panel display and the second surface of the light guide.

Another aspect of the disclosure is a flat panel display comprising a light guiding element illuminated by a light source and a layer of reflective material in contact with a first surface of the light guiding element, wherein the first surface receives light from the light source and transmits the light towards a second surface of the light guide. The flat panel display may further include a display housing adhered to the first surface of the light guiding element.

Yet another aspect of the disclosure is a method of manufacturing a display assembly. The method may include the steps of providing a light guiding element having a first surface and a second surface and providing a light source operable to illuminate the light guiding element. The method may also include depositing a layer of reflective material in contact with the first surface of the light guiding element, wherein the first surface receives light from the light source and transmits the light towards the panel and the second surface of the light guiding element. In addition, the method includes the step of adhering the first surface of the light guiding element to a display housing.

BRIEF DESCRIPTION OF THE DRAWINGS

For detailed understanding of the present disclosure, references should be made to the following detailed description of the several aspects, taken in conjunction with the accompanying drawings, in which like elements have been given like numerals and wherein.

DETAILED DESCRIPTION

Figure 1:
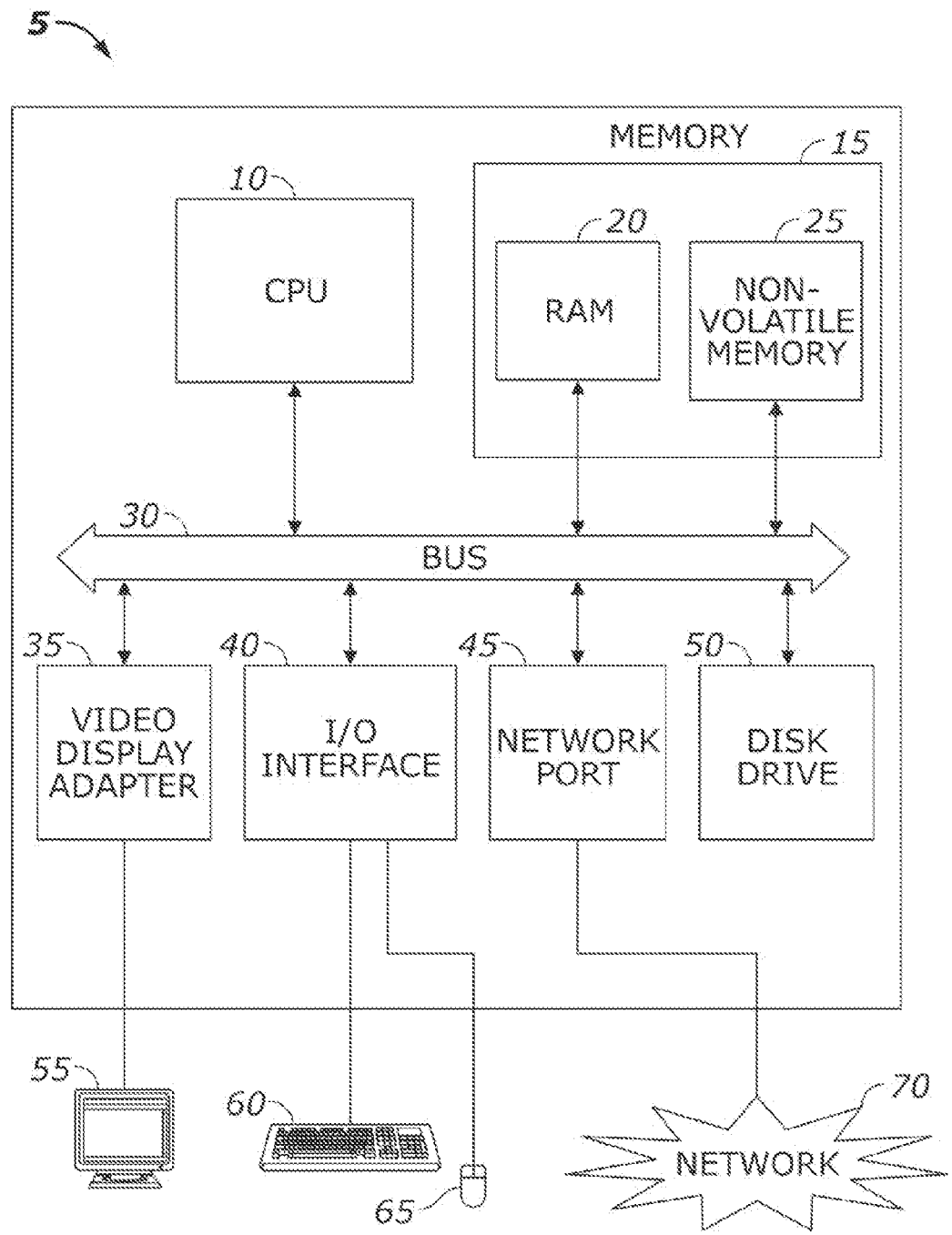
FIG. 1 represents an information handling system (IHS) in accordance with one aspect of the present disclosure.

Before the present apparatus, systems, and methods are described, it is to be understood that this disclosure is not limited to the apparatus, systems and methods described, as such may vary. One of ordinary skill in the art should understand that the terminology used herein is for the purpose of describing possible aspects, embodiments and/or implementations only, and is not intended to limit the scope of the present disclosure which will be limited only by the appended claims.

This disclosure is not limited in its application to the details of construction and the arrangement of components set forth in the following description or illustrated in the drawings. The disclosure is capable of other embodiments, implementations or aspects and of being practiced or of being carried out in various ways. Also, the use of "including," "comprising," "having," "containing," "involving," "consisting" and variations thereof, is meant to encompass the items listed thereafter and equivalents thereof as well as additional items.

It must also be noted that as used herein and in the appended claims, the singular forms "a," "and," and "the" may include plural referents unless the context clearly dictates otherwise. Thus, for example, reference to "a display" refers to one or several displays, and reference to "a method of processing" includes reference to equivalent steps and methods known to those skilled in the art, and so forth.

For purposes of this disclosure, an embodiment of an Information Handling System (IHS) may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an IHS may be a personal computer, a storage device, or any other suitable device and may vary in size, shape, performance, functionality, and price. The IHS may include random access memory (RAM), one or more processing resources such as a central processing unit (CPU) or hardware or software control logic, ROM, and/or other types of nonvolatile memory. Additional components of the IHS may include one or more disk drives, one or more network ports for communicating with external devices as well as various input and output (I/O) devices, such as a keyboard, a mouse, and a video display. The IHS may also include one or more buses operable to transmit data communications between the various hardware components.

FIG. 1 illustrates one possible implementation of an IHS 5 comprising a CPU 10. It should be understood that the present disclosure has applicability to IHSs as broadly described above, and is not intended to be limited to the IHS 5 as specifically described. The CPU 10 or controller may comprise a processor, a microprocessor, minicomputer, or any other suitable device, including combinations and/or a plurality thereof, for executing programmed instructions. It is appreciated that execution of the algorithm to be described below occurs in the processor or the CPU 10. The CPU 10 may be in data communication over a local interface bus 30 with components including memory 15 and input/output interfaces 40. The memory 15, as illustrated, may include non-volatile memory 25. The non-volatile memory 25 may include, but is not limited to, flash memory, non-volatile random access memory (NVRAM), and electrically erasable programmable read-only memory (EEPROM). The non-volatile memory 25 may contain a firmware program (not shown) which may contain programming and/or executable instructions required to control a keyboard 60, mouse 65, video display 55 and/or other input/output devices not shown here. This type of firmware may be known as a basic input/output system (BIOS). The memory may also comprise random access memory (RAM) 20. The operating system and application programs (e.g., graphical user interfaces) may be loaded into the RAM 20 for execution.

The IHS 5 may be implemented with a network port 45 to permit communication over a network 70 such as a local area network (LAN) or a wide area network (WAN), such as the Internet. As understood by those skilled in the art, IHS 5 implementations may also include an assortment of ports and interfaces for different peripherals and components, such as video display adapters 35, disk drives port 50, and input/output interfaces 40 (e.g., keyboard 60, mouse 65).

Figure 2:
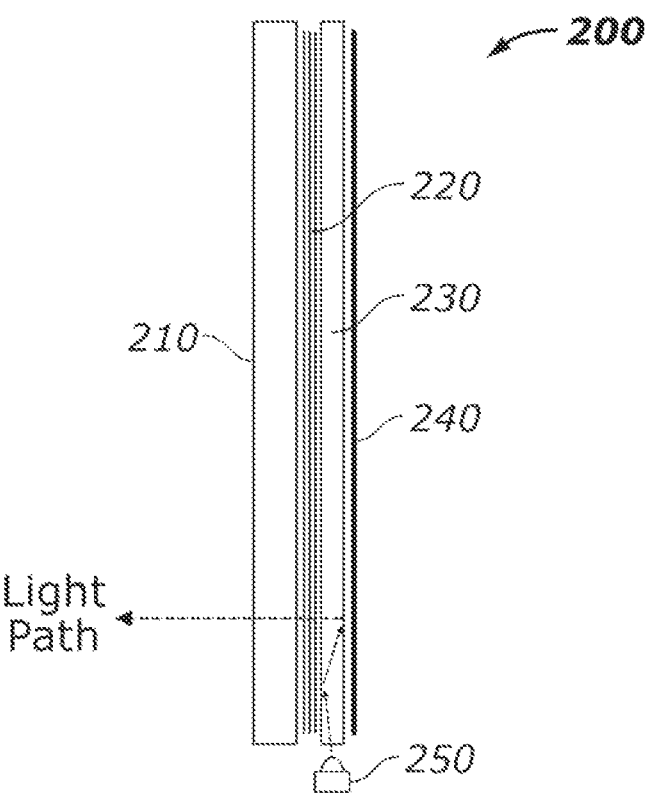
FIG. 2 represents one view of an IHS display assembly in accordance with one aspect of the present disclosure.

FIG. 2 provides a one view of an IHS display assembly 200. One form of a display may include, for example, a liquid crystal display (LCD). The display assembly 200 may include various elements including, but not limited to, a panel 210, a filter and/or polarizing film 220, a light guide 230, reflecting film 240, and a light source 250. A light guide 230, also known as a light guiding element, as shown located within the display assembly 200 interior to the panel 210, may direct light from a light source 250 towards the panel 210. The light guide 230 may be formed of materials including, but not limited to, poly(methyl methacrylate) (PMMA), polycarbonate, polyethylene terephthalate (PET), styrene, or a combination thereof.

A light source 250, also referred to as a backlight, may illuminate one surface of the light guide 230 utilizing a bulb, such as a light-emitting diode (LED), or a lamp including a cold cathode fluorescent lamp (CCFL). A first (e.g., front, anterior) surface of the light guide 230 may be flat or smooth to allow light at a low angle of incidence to strike the front surface of the light guide 230 to pass through the panel 210. A second (e.g., back, posterior) surface of a light guide 230 may include a series of prisms 330 or suitable surface(s) to refract light. The prisms 330 may have triangular surfaces, for example, that traverse left to right across the width of the light guide 230. The leading a trailing angles of the prisms 330 may be optimized to the reflective or refractive properties of the material(s) from which the light guide 230 is constructed, which reflect light toward the front surface or away from the back surface of the light guide 230. As used herein, the "front surface" of the light guide 230 may refer to its surface in closer proximity to the panel 210 or filter and/or polarizing film 220, relative to the "back surface" of the light guide 230. The reflective properties of a light guide 230 may be characteristic of the material(s) composing the light guide 230, as mentioned previously. While some light may escape through the back surface of the light guide, light striking the reflecting film 240 may reflect back towards the light guide 230. Once light passes through the light guide 230, the filter and/or polarizing film 220 may block or allow the light to pass through to the LCD panel 210 depending on the angle of incidence at which the light strikes the light guide 230 (described below). A panel 210 may contain conventional liquid crystals as is known in the art, and as such, may be manipulated to allow the light to form a desired image. The panel 210 may also include a housing (not shown) utilized to protect the display from damage.

While several implementations discussed herein may specifically refer to a panel type such as an LCD, for example, it is recognized by one of ordinary skill in the art that a light guide 230 is not specifically limited to use in a LCD. Generally, a light guide 230 may be utilized with any suitable light source 250 to provide a lit surface for any type of viewable display or the like.

Figure 3:
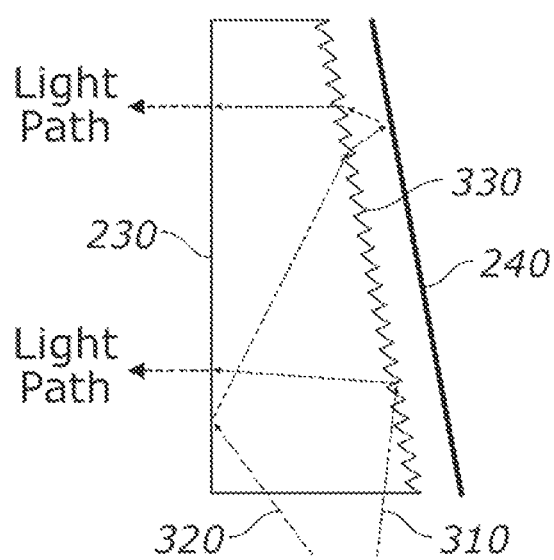
FIG. 3 represents one view of an IHS display assembly with a light guide in accordance with one aspect of the present disclosure.

Referring now to FIG. 3, a schematic is provided representing a one view of an IHS display assembly with a light guide 230 disposed therein. In one implementation, the light guide 230 may be formed of polished acrylic or other suitable material. A back surface 350 of a light guide 230 may include multiple prisms 330 utilized to reflect light provided by a light source towards the front surface 340 of the light guide 230. As the light guide 230 is illuminated by a light source, light may travel through the light guide 230 and may be reflected by a series of prisms 330 toward the front surface 340 of the light guide 230. The polished surface of the light guide 230 causes light to be reflected back into the light guide 230 when the angle of incidence exceeds a predetermined angle. In general, the light in contact with the light guide 230 may be a series of rays that are emitted from the light source and may travel in a direction parallel to the width axis of the light guide 230. As rays of light start to hit the prisms 330, the parallel direction of the rays may be reflected by the prisms 330. Upon reflection by the prisms, light may start to scatter and some of the light may escape out the prism surface of the light guide 230. For instance, the prismatic properties of a light guide 230 made of acrylic with polished surfaces, for example, may allow light to be reflected back into the light guide 230 if the angle of incidence is greater than 45 degrees. Within the light guide 230, some of the scattered light may escape through the back surface 350 as a result of striking the prisms at various angles, depending on the material in which the light guide 230 is constructed. A ray of light approaching a surface of the prism 330 at an angle near normal to the surface of the prism 330 may exit the light guide 230. In one example, an angle of incidence less than or equal to 45 degrees to the surface of the prism 330 may not support the reflection of light through the light guide 230. As another example, a ray of light hitting the surface of the prism 330 at an oblique angle may be reflected back into the light guide 230.

For example, light following a first light path 310 may strike a polished portion of back surface 350 of the light guide 230 at an angle of incidence greater than 45 degrees causing the light to be reflected toward the front surface 340 of the light guide 230. On a second light path 320, light may strike the front surface 340 of the light guide 230 at an angle of incidence less than 45 degrees causing it to be reflected towards the back surface 350. The light may then strike the back surface at an angle of incidence less than 45 degrees allowing the light to pass through the back surface of the light guide 230 toward the reflecting film 240. In some implementations, space and/or the reflecting film 240 may reside behind the light guide 230 to reflect the stray light back into the light guide 230 toward the front surface 340 as shown by the second light path 320. Examples of reflective materials or materials to be used to form the reflective film 240 may include mirrored materials such as mylar or any metal such as aluminum, silver, or the like. While a variety of metals may reflect light efficiently, other reflective materials such as a white material (e.g., plastic) may be utilized.

Figure 4:
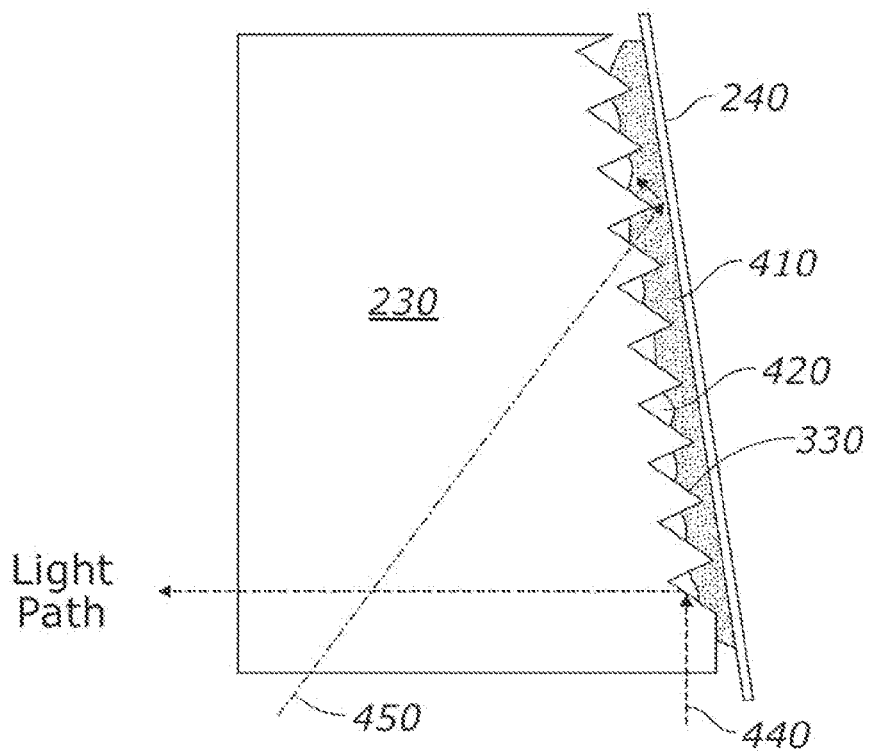
FIG. 4 represents one view of a laminated IHS display assembly in accordance with the prior art.

In order to improve the rigidity of a display assembly while maintaining optical properties of a light guide 230, a reflective material (e.g., metal, reflective/mirroring ink) or film may be adhered to the light guide 230, with an adhesive. FIG. 4 represents an illustrative implementation of a laminated display assembly in accordance with one aspect of the present disclosure. The adhesive 410 may be formed from acrylic, polycarbonate, epoxy, pressure sensitive adhesive, or other suitable component with adhesive properties, applied to a portion of the light guide 230. Moreover, the refractive index of the adhesive 410 may be substantially similar to that of water (i.e., 1.33) or comparable substance.

When a light guide 230 is adhered to a reflecting film 240 using an adhesive 410, the reflective surface of the prism 330 may be impaired and light may continue to travel on approximately the same vector. The ray of light will travel out of the light guide 230 rather than be reflected back into the light guide 230, such as in the case of a "wetted" prism surface. The adhesive will impair the ability of the prisms 330 to immediately reflect light back toward the light guide 230. The prismatic properties of the light guide 230 may be impaired where the adhesive 410 is in contact with the light guide 230. In other words, light may not be properly reflected back into the light guide 230 when it shines on a portion of the light guide 230 that is in contact with the adhesive 410. By way of example, light travelling along a third light path 450 may not be reflected by the light guide 230 and may pass through the adhesive 410 layer if it strikes a portion of the light guide 230 in contact with the adhesive 410. The light may pass through the adhesive 410 reflecting off the reflecting film 240 and scatter randomly inside the light guide 230. It may be difficult, therefore, to laminate a light guide 230 to the reflecting film 240 without impairing the performance of the display. Light travelling along a fourth light path 440 indicates the reflective light path of a "non-wetted" surface.

Figure 5:
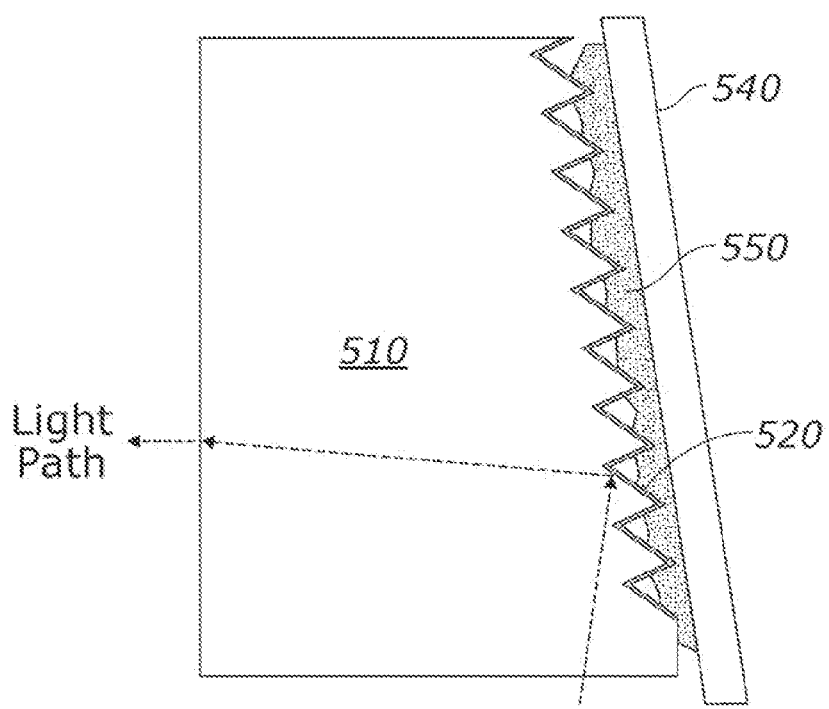
FIG. 5 represents one view of an IHS display assembly with a reflective coating in accordance with one aspect of the present disclosure.

In order to provide a light guide 230 not in contact with a "wetted" surface, a layer of reflective material may be provided on a back surface of the light guide. The reflective material may enable the series of prisms on the light guide to reflect light as intended. Turning now to FIG. 5, a light guide 230, as shown, may include prisms 330 on the back surface 350 coated with a thin layer of reflective coating 520. The reflective coating 520, made from the reflective material described previously, prevents light from escaping the back surface 350 of the light guide 230. Having a reflective coating 520 in direct contact with the prisms 430 creates an effect whereby the light guide 230 is no longer in direct contact with any air pocket/space. Thus, light striking the light guide 230, at any angle of incidence, may be reflected back into the interior 340 of the light guide 230. By eliminating contact of "wetted", adhesive surfaces with the light guide 230 by using a reflective coating 520, a display may be adhered to its assembly without affecting the optical properties of the display.

The application of the reflective coating 520 to contact the light guide 230 may occur via numerous methods including, but not limited to, physical vapor deposition (PVD), chemical vapor deposition (CVD), sputter deposition, plating, spraying, printing, fiber optic cladding, or any other suitable technique. PVD may generally refer to a method of depositing a thin film of reflective material (e.g., metal, aluminum, silver, gold) by condensing the material onto a surface. In the present disclosure, the reflective coating 520 may be applied directly in contact with the light guide 320, forming a plasma molten state on the back surface 350 surface of the light guide 230. Similarly, the reflective coating 520 may be applied by a conventional sputtering technique by which reflective material may used to bombard the light guide 230. Alternatively, the reflective coating 520 may be coated to react with the surface of light guide 230 as exhibited by the CVD method.

By eliminating physical contact between a light guide optical surface and adhesive layer, the optical properties of a display and compactness of a display assembly may be maintained despite adhesion or lamination of a display assembly (i.e., display, light guide) to increase the strength and rigidity of a display. Consequently, providing a reflective coating in direct contact with a display assembly may allow displays to be made thinner without compromising the rigidity of the display.

Various methods are contemplated including all or less than all of the steps described herein and/or mentioned above, any number of repeats or any of the steps shown and/or mentioned above, and performance of the steps in any order. Although the present disclosure has been described with reference to particular examples, embodiments and/or implementations, those skilled in the art will recognize that modifications and variations may be made without departing from the spirit and scope of the claimed subject matter. Such changes in form and detail, including use of equivalent functional and/or structural substitutes for elements described herein, fall within the scope of the appended claims and are intended to be covered by this disclosure.

What is claimed is:

1. A display assembly comprising:
   a panel display;

a light guiding element having a first surface and a second surface, wherein the second surface of the light guiding element includes one or more prisms and wherein the one or more prisms have a reflective coating in direct contact with the one or more prisms;

a light source operable to illuminate the light guiding element;

a layer of reflective material in contact with the first surface of the light guiding element, wherein the first surface receives light from the light source and transmits the light towards the panel display and the second surface of the light guide.

2. The assembly of claim 1, wherein the reflective material is selected from the group consisting of aluminum, silver, minor ink, nickel, tin, plastic and a combination thereof.

3. The assembly of claim 1, wherein the reflective material is deposited on the light guide by physical vapor deposition (PVD), chemical vapor deposition (CVD), sputtering or spraying.

4. The assembly of claim 1, wherein the light guiding element comprises acrylic, polymethyl methacrylate (PMMA), styrene, polycarbonate, or a combination thereof.

5. The assembly of claim 1, wherein the light source is selected from a light-emitting diode (LED) or a cold cathode fluorescent lamp (CCFL).

6. The assembly of claim 1 further comprising a display housing, the light source and the light guiding element disposed within the display housing and wherein the reflective material surface of the light guiding element is adhered to the display housing.

7. The assembly of claim 6, wherein the first surface of the light guiding element is coupled to the housing via an adhesive.

8. A flat panel display comprising:
a light guiding element illuminated by a light source, wherein the light guiding element has a first surface and a second surface and wherein the second surface includes one or more prisms;

a layer of reflective material in contact with the first surface of the light guiding element, wherein the first surface receives light from the light source and transmits the light towards a second surface of the light guide;

a reflective coating in contact with the one or more prisms; and a display housing adhered to the first surface of the light guiding element.

9. The display of claim 8, wherein the reflective material is selected from the group consisting of aluminum, silver, mirror ink, nickel, tin, plastic and a combination thereof.

10. The display of claim 8, wherein the reflective material is deposited on the light guide by physical vapor deposition (PVD), chemical vapor deposition (CVD), sputtering or spraying.

11. The display of claim 8, wherein the light guiding element comprises acrylic, polymethyl methacrylate (PMMA), styrene, polycarbonate or a combination thereof.

12. The display of claim 8, wherein the light source is selected a light-emitting diode (LED) or a cold cathode fluorescent lamp (CCFL).

13. The display of claim 8 further comprising a display housing, the light source and the light guiding element disposed within the display housing and wherein the first surface of the light guiding element is adhered to the display housing.

14. The display of claim 13, wherein the first surface of the light guiding element is coupled to the housing via an adhesive.

15. A method for illuminating a panel display comprising the steps of:
illuminating a light guiding element of the panel display by a light source, wherein the light guiding element has a first surface and a second surface; and receiving at the first surface light from the light source, wherein the first surface is in contact with a layer of reflective material;

reflecting light from the first surface at a low angle of incidence to the panel display and the second surface;

receiving at the second surface light reflected from the first surface, wherein the second surface includes one or more prisms and wherein the one or more prisms have a reflective coating in direct contact with the one or more prisms; and reflecting light at the second surface towards the panel display.

16. The method of claim 15 further comprising the step of:
reflecting light received at a reflecting film in contact with the second surface toward the first surface of the light guiding element, wherein the light received at the reflecting film is light that has escaped from the second surface.

17. The method of claim 15 further comprising the step of:
allowing light to pass through a polarizing film in contact with the light guiding element to the panel display.

18. The method of claim 15 further comprising the step of:
manipulating liquid crystals of the panel display to allow light received at the panel display to form an image.

19. The method of claim 18, wherein the one or more prisms are in direct contact with a reflective coating.

20. The method of claim 15, wherein the second surface includes one or more prisms.

* * * * *